United States Patent

Lundberg

[11] 3,977,741
[45] Aug. 31, 1976

[54] WHEEL BEARING ASSEMBLY

[75] Inventor: Sten Lundberg, Lerum, Sweden

[73] Assignee: SKF Industrial Trading and Development Company, B.V., Nieuwegein, Netherlands

[22] Filed: June 12, 1974

[21] Appl. No.: 478,577

[30] Foreign Application Priority Data
June 27, 1973 Sweden .......................... 7309020
Dec. 10, 1973 Sweden .......................... 7316610

[52] U.S. Cl. .......................... 308/207 R; 295/36 A; 295/44; 308/16; 308/180; 308/196; 308/216; 308/217

[51] Int. Cl.² .................. F16C 19/04; F16C 33/60; F16C 33/78; F16C 35/06

[58] Field of Search ............... 295/36 R, 36 A, 37, 295/44; 308/180, 16, 196, 207 R, 216, 217

[56] References Cited
UNITED STATES PATENTS

| | | | |
|---|---|---|---|
| 1,379,945 | 5/1921 | Teetsow | 308/196 |
| 1,824,002 | 9/1931 | Weckstein | 308/207 R |
| 2,023,091 | 12/1935 | Oelkers | 295/36 A |
| 2,025,343 | 12/1935 | Oelkers et al. | 295/36 A |
| 2,113,497 | 4/1938 | Sanford | 295/44 |
| 2,258,570 | 10/1941 | Horger | 308/180 |
| 2,573,735 | 11/1951 | Sanford et al. | 295/44 |
| 2,576,651 | 11/1951 | Super | 308/207 R |
| 2,660,490 | 11/1953 | Jones | 308/180 |
| 3,131,006 | 4/1964 | Anderson | 308/180 X |
| 3,529,876 | 9/1970 | Pitner | 308/207 R |
| 3,570,409 | 3/1971 | Oelkers | 295/37 |

FOREIGN PATENTS OR APPLICATIONS

| | | | |
|---|---|---|---|
| 742,135 | 11/1943 | Germany | 295/36 A |
| 57,560 | 3/1919 | Sweden | 295/36 A |
| 215,662 | 9/1967 | Sweden | 295/36 A |

*Primary Examiner*—Robert J. Spar
*Assistant Examiner*—Howard Beltran
*Attorney, Agent, or Firm*—Daniel M. Rosen

[57] ABSTRACT

A wheel bearing assembly comprising inner and outer race rings defining between them axially spaced raceways and rolling elements, the inner race ring formed of two axially spaced rings between which is a spacer sleeve and fastener means between said rings and said sleeve for maintaining a fixed axial relationship between said rings and sleeve and for maintaining the components of this assembly together.

6 Claims, 2 Drawing Figures

WHEEL BEARING ASSEMBLY

BACKGROUND OF THE INVENTION

The present invention relates to a wheel bearing device, preferably for heavy motor vehicles.

Up to now, the most common bearing application for a non-driven vehicle wheel comprises two single-row tapered roller bearings mounted on each end of a stub axle. For lightweight vehicles it is also known to use a double-row angular contact ball bearing or a deep groove ball bearing and a cylindrical roller bearing. For heavy vehicles all applications comprise two roller bearings, because roller bearings have a greater load capacity than ball bearings of corresponding dimensions. When mounting such roller bearings, the risk of improper tightening of the bearings occurs, since tightening of the bearings takes place by tightening of a nut, which is provided on a threaded portion of the stub axle. Furthermore, the bearings are exposed to great risks of contamination due to the fact that they are not protected during mounting and dismounting when for example, brake parts are replaced or adjusted.

With a device according to the present invention, the characterizing features of which will appear in the accompanying claims, these risks are eliminated. Furthermore, a bearing unit is achieved, which is easy and cheap to make, and with which mounting and dismounting of the wheel and the wheel hub are simplified.

The invention will now be further described with reference to the accompanying drawings.

DETAILED DESCRIPTION OF THE PREFERRED EMBODIMENTS

Figure 1:
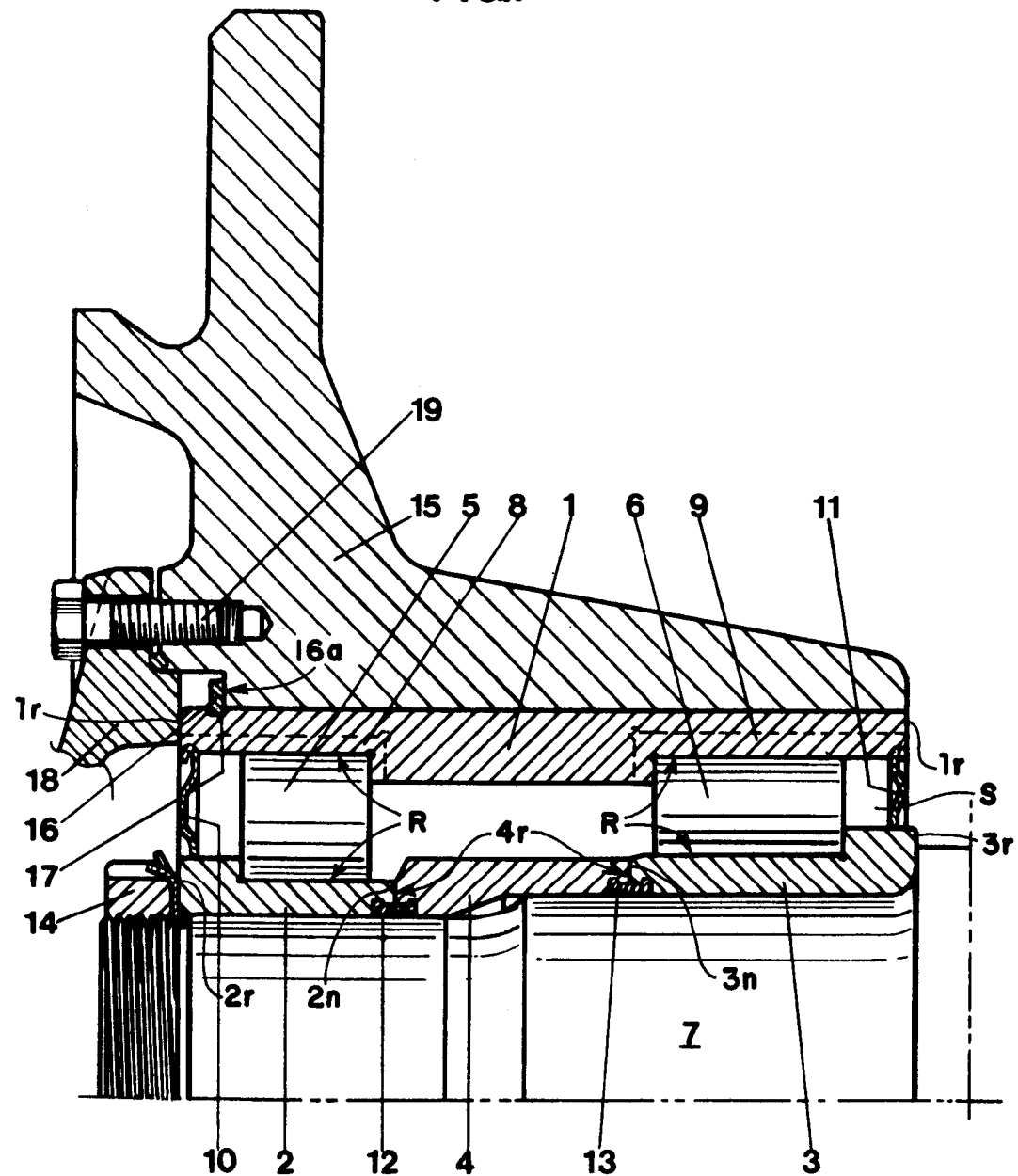
FIG. 1 is a fragmentary transverse sectional view of a first embodiment of the invention.

FIG. 1 shows a bearing unit incorporating an outer race ring 1, an inner race ring formed of two inner race ring elements or rings 2, 3, a spacer sleeve 4 between the inner rings, and two rows of rolling elements or bodies 5, 6 provided in raceways between the outer ring and the inner rings, mounted on a stub axle 7. Each raceway is formed by radially spaced adjacent raceway surfaces R in said race rings. It is also possible to provide the raceways for the outer ring 1 on separate race rings, which are mounted in the ring 1. This is shown with dashed lines and the separate race rings have the references 8, 9. Seals 10, 11 are provided on each side of the bearing unit. For convenience in discussing the relationship of the components of this bearing assembly the following structural details of certain elements shown in the drawings are identified. Spacer sleeve 4 has remote opposite ends 4r; inner race rings 2 and 3 have rear ends 2n and 3n respectively, and remote opposite ends 2r and 3r, respectively; and outer race ring 1 has remote opposite ends 1r radially spaced from and adjacent to the remote ends 2r, 3r of the inner race rings. Adjacent ends 4r and 3n for example, comprise one of two pairs of axially adjacent ends; adjacent ends 1r and 3r also comprise one of two pairs of radially adjacent ends with a typical, annular space S defined between a pair of ends 1r and 3r and seal 11 closing said space.

The bearing unit is kept together before mounting on the stub axle 7 by the fact that fastening means formed as resilient locking rings 12, 13 with radially outwardly projecting rims are inserted in grooves in the insides of the inner rings and the spacer sleeve respectively at the two pairs of adjacent ends 4r, 2n and 4r, 3n. The unit can thus be delivered complete, assembled and prelubricated. After mounting on the stub axle, the unit is retained by contact against a nut 14, which is provided on a threaded portion of the free end of the stub axle.

The hub portion 15 is fixed to the outer ring 1 of the bearing by a flange ring 16 extending radially outward, which is provided in a groove 17 in the outer ring and contacts a radial surface 16a of the hub. In order to secure the hub against inwardly directed axial forces, a cover 18 as a second fastener means is bolted to the hub 15 by screws 19. This cover contacts the end surface 1a of the outer ring 1.

When removing the wheel from the stub axle 7, it is suitable to remove both the hub and the bearing as a unit from the stub axle. Accordingly the cover 18 first has to be removed, and then the nut 14, whereafter the whole unit can be taken off in a suitable way.

Figure 2:
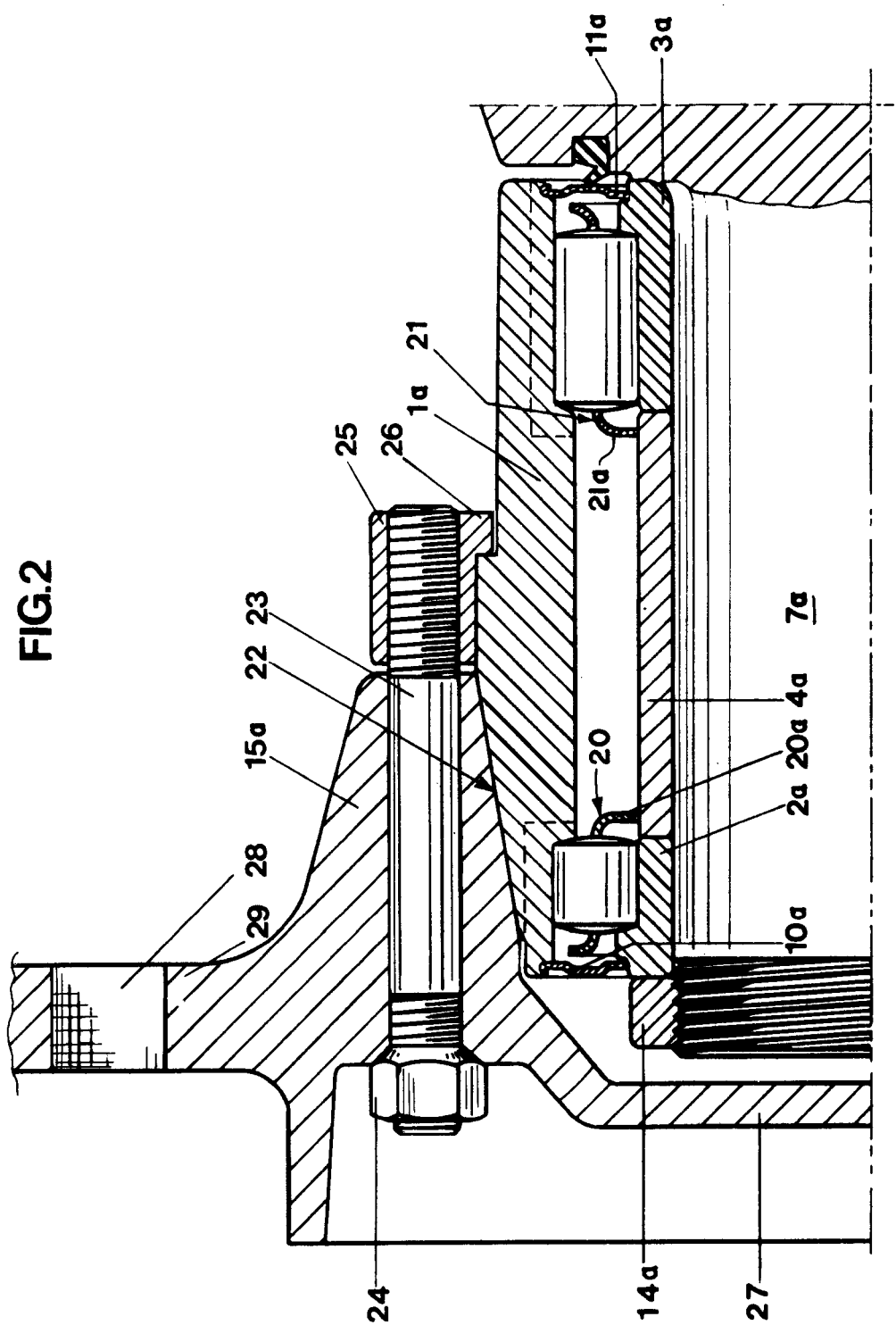
FIG. 2 is a similar view of a second embodiment of the invention.

The embodiment shown in FIG. 2 differs from the one shown in FIG. 1 regarding the means for fixing the hub to the outer ring and the means for keeping the unit together.

The bearing unit is kept together before mounting on the shaft 7a by the fact that the seals 10a, 11a keep the inner rings 2a, 3a in place, and that cages 20, 21 for the rollers are so designed that they keep the spacer sleeve 4a centered by inward extending flanges 20a and 21a. The unit according to this embodiment can thus also be delivered complete in one piece and prelubricated. After mounting it is kept in position on the stub axle by contact against a nut 14a which is provided on a threaded portion of the free end of the stub axle 7a.

The outer surface of the outer ring 1a comprises a tapered portion 22, on which the wheel hub 15a, which has a central tapered bore corresponding to the taper 22, is mounted. The hub is retained on the outer ring 1a by a bolt joint comprising a number of screws 23 and nuts 24.

The screws are secured to a mounting ring 25, which with a flange 26 contacts a collar on the outer ring 1a. It is also possible to replace the mounting ring 25 with a number of mounting blocks.

The central portion of the wheel hub 15a is closed by a part 27. The hub is also provided with a number of bores 28 in a radial flange 29, intended for the mounting of the wheel rim, a brake drum or the like.

When the wheel is to be dismounted, when brakes are replaced, the nuts 24 are disconnected and the hub 15a is removed from the outer ring 1a of the bearing. The bearing unit thus remains on the stub axle 7a, and due to the existence of the seals 10a and 11a; this unit is protected against contamination.

It is not possible to dismount the wheel by removing the bearing unit from the stub axle, because the hub portion 27 prevents access to the nut 14. If the bearing unit is to be removed, e.g. for replacement of bearings, the hub 15a first has to be dismounted as above. This means that the bearing is not unnecessarily exposed to risks for contamination and improper mounting.

Also other embodiments of the invention are possible within the scope of the claims. For example, the mounting ring 25 and the collar on the ring 1a according to FIG. 2 can be replaced with a flange or a number of projections on the ring 1a for securing the screws 23. It is also possible to replace the spacer sleeve 4a by elongating one of the inner rings of the bearing. It is also possible to provide the bearing with only one inner ring and a loose flange against which one row of rolling elements is pressed when the bearing is axially loaded in one direction.

I claim:

1. In a bearing assembly for use between a shaft and a wheel hub, including the components, inner and outer race rings with corresponding inner and outer ring raceway surfaces respectively defining two axially spaced raceways and a plurality of rolling elements in said raceways, the improvement in combination therewith wherein said inner race ring comprises first and second inner ring elements axially spaced apart, each of which includes one of said inner ring raceway surfaces, and a spacer sleeve between and axially aligned with said first and second inner ring elements, and fastening means engaging only the inner ring elements and the spacer sleeve for maintaining said first and second inner ring elements in fixed axial relationship with said spacer sleeve and for maintaining all of said components together as an assembly independent of said shaft and wheel hub.

2. An assembly according to claim 1, wherein said spacer sleeve has first and second opposite ends, and each of said ring elements has one end adjacent one of said spacer sleeve ends, forming two pairs of adjacent ends, and wherein said fastening means comprises a resilient locking ring engaging each of said pairs of adjacent ends.

3. An assembly according to claim 1, wherein said outer race ring has remote outer ends, said first and second inner race ring elements have corresponding remote outer ends which are adjacent and radially spaced from the outer race ring ends, forming two pairs of adjacent radially spaced outer ends with annular spaces defined therebetween, and said fastening means comprises a sealing ring engaging each of said pairs of radially spaced ends and closing the corresponding annular space.

4. An assembly according to claim 1, further comprisng a wheel hub having a bore in which said outer race ring is disposed, and means for maintaining the relative axial positions of said hub and outer race ring comprising two axially spaced parts of said hub, a flange extending generally outward from said outer race ring for engaging one of said parts and preventing relative axial movement therebetween in a first direction, and a second fastener means for engaging said other part of the hub and one end of said outer race ring and preventing relative axial movement therebetween in a direction opposite said first direction.

5. In a bearing assembly for use between a shaft and a wheel hub, including the components, inner and outer race rings with corresponding inner and outer ring raceway surfaces respectively defining two axially spaced raceways and a plurality of rolling elements in said raceways, the improvement in combination therewith wherein one of said inner and outer race rings comprises first and second ring elements axially spaced apart, each of which includes one of said raceway surfaces, and a spacer sleeve between and axially aligned with said first and second ring elements and fastening means engaging only the ring elements and the spacer sleeve for maintaining said first and second ring elements in fixed axial relationship with said spacer sleeve and for maintaining all of said components together as an assembly independent of said shaft and wheel hub.

6. In a bearing assembly for use between a shaft and a wheel hub, including the components, inner and outer race rings with corresponding inner and outer ring raceway surfaces respectively defining two axially spaced raceways and a plurality of rolling elements in said raceways with a cage circumferentially spacing the rolling elements in each raceway, the improvement in combination therewith wherein said inner race ring comprises first and second inner ring elements axially spaced apart, each of which includes one of said inner ring raceway surfaces, and a spacer sleeve between and axially aligned with said first and second inner ring elements, said improvement further comprising a flange extending radially inward from each cage for engaging said spacer sleeve and maintaining said spacer sleeve radially centered relative to said inner and outer race rings, said outer race ring having remote outer ends, each inner race ring element having an outer end adjacent and radially spaced from one of said outer race ring outer ends, forming a pair of radially spaced ends, and fastening means engaging and maintaining in fixed axial relationship said ends of each of said pairs of ends.

* * * * *